United States Patent [19]
Gardner et al.

[11] Patent Number: 5,639,097
[45] Date of Patent: Jun. 17, 1997

[54] GAS SEAL "O" RING HOLDER

[75] Inventors: James F. Gardner; Matthew D. Cunningham, both of Cranston, R.I.

[73] Assignee: EG&G Sealol, Inc., Cranston, R.I.

[21] Appl. No.: 355,217

[22] Filed: Dec. 9, 1994

[51] Int. Cl.$^6$ ........................... F16J 15/38
[52] U.S. Cl. ............................. 277/87
[58] Field of Search ................ 277/40, 81 R, 277/85, 87, 92, 93 SD, 215

[56] References Cited

U.S. PATENT DOCUMENTS

| | | | |
|---|---|---|---|
| 2,419,385 | 4/1947 | Beier | 277/85 |
| 2,593,899 | 4/1952 | Krug | 277/40 |
| 2,607,615 | 8/1952 | Katcher | 277/87 |
| 2,672,360 | 3/1954 | Chambers, Jr. et al. | 277/40 |
| 3,319,968 | 5/1967 | Yost | 277/87 |
| 3,592,479 | 7/1971 | Andresen | 277/87 |
| 4,183,541 | 1/1980 | Wentworth, Jr. | 277/87 |
| 4,768,790 | 9/1988 | Netzel et al. | 277/81 R |
| 4,889,348 | 12/1989 | Amundson et al. | 277/81 R |
| 5,039,113 | 8/1991 | Gardner | 277/81 |
| 5,213,342 | 5/1993 | Weber | 277/152 |
| 5,370,403 | 12/1994 | Sedy | 277/85 |

FOREIGN PATENT DOCUMENTS

WO94/13982  6/1994  WIPO .

*Primary Examiner*—William A. Cuchlinski, Jr.
*Assistant Examiner*—John L. Beres
*Attorney, Agent, or Firm*—Finnegan, Henderson, Farabow, Garrett, and Dunner

[57] ABSTRACT

A stationary assembly for use in a gas or liquid seal for sealing an interface between a machine body and a rotatable shaft. The stationary assembly includes an annular seal ring attached to the machine body and surrounding the shaft. An annular seal ring housing secures the seal ring and includes a plurality of bores. Each bore retains a spring. A circumferentially flexible "O" ring holder receives the springs. The "O" ring holder presses an "O" ring against a balance diameter surrounding the shaft and the seal ring to provide a seal. The "O" ring holder includes a plurality of slots formed therein and arranged to provide the circumferential flexibility.

24 Claims, 2 Drawing Sheets

GAS SEAL "O" RING HOLDER

BACKGROUND OF THE INVENTION

1. Field of the Invention

The present invention relates to a gas seal, and more specifically, to an "O" ring holder for use in a gas seal.

2. Description of the Related Art

In a conventional gas seal, an "O" ring is placed between the stationary seal ring and the stationary seal ring carrier to provide a secondary dynamic seal. The seal ring is typically manufactured from materials having low thermal expansion coefficients, such as carbon graphite, silicon carbide, or tungsten carbide. The ring carrier in such a conventional gas seal is fabricated from metal, such as stainless steel, Inconel 625, or another metal having good corrosion and temperature resistance, and the required strength. These metals from which the carriers are formed have coefficients of expansion approximately three times that of the typical seal ring materials.

The seal rings are mounted within a stationary housing and mounted over a metal balance diameter connected to the stationary housing and centering the seal ring. A clearance exists between the balance diameter and seal ring to compensate for differential thermal growth between the two. For a seal with a 4.625 inch balance diameter, a diametrical clearance of 0.015 to 0.019 inches is common. During operation, the seal assembly becomes hot, with temperatures up to approximately 350° to 400° F. When the assembly heats, the balance diameter expands relative to the seal ring and centers the seal ring.

However, differential thermal expansion between the balance diameter and the seal ring will create variability in the squeeze force on the "O" ring. Typically, a light original radial squeeze is employed of approximately 5% for a 0.139 inch diameter "O" ring cross section. The variability in the squeeze can be as much as ±4%. The variation occurs not only from differing expansion rates but also from the stack up of tolerances in the "O" ring and mating components. This variability will adversely effect both "O" ring friction and the dynamic tracking of the stationary seal ring. "O" ring stiffness (i.e., the force preventing opening and closing) of the sealing faces may be as high as 100,000 pounds per inch. This is typical for a five inch diameter "O" ring at 1000 psig.

"O" ring friction is a particularly dominant parameter affecting seal performance during low pressure applications. The friction force imparted by the "O" ring is a much larger percentage of the gas pressure forces acting on the seal faces. Often, premature failure of the seal results from excessive "O" ring friction.

Attempts have been made to eliminate the differential thermal squeeze on the "O" ring by placing the "O" ring between a metallic "O" ring holder and a metallic seal ring carrier. Thermal squeeze is limited by placing the "O" ring between two components of similar material having similar coefficients of thermal expansion.

U.S. Pat. No. 5,039,113 to Gardner, owned by applicants' assignee and incorporated herein by reference, discloses a pusher type non-contacting gas seal incorporating a dynamic "O" ring. As shown in FIG. 7 of this patent, the seal, generally referred to by reference numeral 100, includes a stationary seal ring assembly 102 attached to a machine body 104 and opposing a rotary assembly 106 attached to a rotatable shaft 108.

The seal uses a T-shaped "O" ring holder 110 to minimize drag placed on a stationary seal ring 112 by an "O" ring 114. Dynamic tracking capability is thereby enhanced. The "O" ring 114 is radially squeezed between the "O" ring holder 110 and a seal ring housing 116, both made of metals having similar coefficients of thermal expansion. By having the "O" ring radially squeezed between metals of similar thermal expansion, thermal expansion of the "O" ring holder 110 and the seal ring housing 116 does not create a substantial change in the "O" ring radial squeeze.

SUMMARY OF THE INVENTION

Applicants have discovered that "O" ring stiffness due to tolerances reduces free axial motion (i.e., back and forth sliding) of the "O" ring holder 110 disclosed in Gardner. Thus, "O" ring frictional forces can be significantly increase due to tolerance stack up, possibly leading to seal failure.

An object of the invention is to provide an improved seal and reduce the variation in radial squeeze imparted on an "O" ring secondary seal. A further object is to provide a seal requiring a reduced force, as compared to conventional seals, to overcome "O" ring frictional forces due to tolerance stack up and thermal, centrifugal, and pressure effects. A still further object of the invention is to provide a seal of greater dynamic tracking capability.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, the invention comprises a stationary assembly for use in a gas seal for sealing an interface between a machine body and a rotatable shaft. The stationary assembly includes an annular seal ring attached to the machine body and surrounding the shaft. An annular seal ring housing secures the seal ring and includes a plurality of bores. Each bore retains a spring. A circumferentially flexible "O" ring holder receives the springs. The "O" ring holder presses an "O" ring against a balance diameter surrounding the shaft and the seal ring to provide a seal. The "O" ring holder includes a plurality of slots formed therein and arranged to provide the circumferential flexibility.

It is to be understood that the foregoing general description and the following detailed description are exemplary and explanatory only and are not restrictive of the invention as claimed.

BRIEF DESCRIPTION OF THE DRAWINGS

The accompanying drawings are included to provide a further understanding of the invention and are incorporated in and constitute part of the specification, illustrate preferred embodiments of the invention, and together with a description, serve to explain the principles of the invention.

DETAILED DESCRIPTION OF THE PREFERRED EMBODIMENTS

Figure 1:
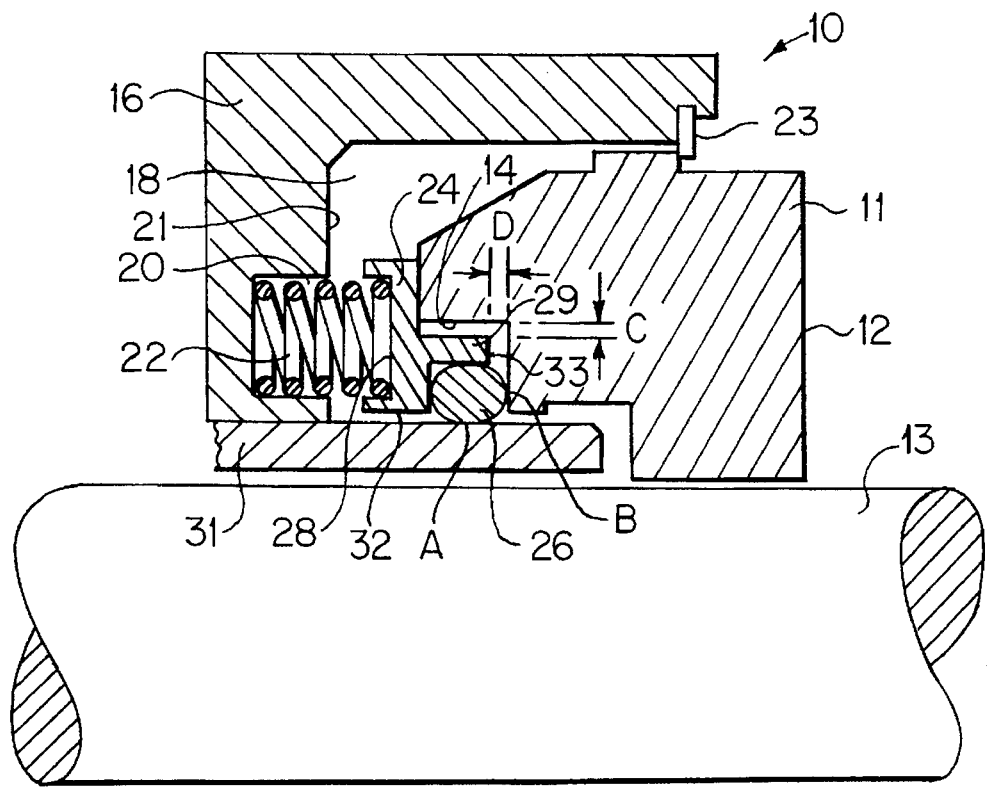
FIG. 1 is a partial cross-sectional view of the stationary assembly of a gas face seal incorporating a compliant "O" ring holder according to the present invention.

Reference will be made in detail to the present preferred embodiments of the invention, examples of which are illustrated in the accompanying drawings. Like reference numerals refer to like parts in the various figures of the drawings.

FIG. 1 shows a partial cross-sectional view of an annular stationary assembly of a gas face seal, generally referred to as reference numeral 10. The stationary assembly 10 attaches to a stationary machine body (not shown) and surrounds a rotatable shaft 13 extending from the machine body. The gas seal is used to seal the interface between the rotatable shaft 13 and the machine body.

As shown, the stationary assembly 10 includes a stationary seal ring 11 having a sealing face 12 opposing a rotary seal ring face (not shown). The seal ring 11 further includes an annular notch 14 formed in the radially inner back portion of the seal ring 11. Preferably, the seal ring 11 is made of carbon graphite, silicon carbide, tungsten carbide, or other suitable material known in the art.

An annular stationary seal ring housing 16 retains the seal ring 11 in an annular pocket 18. The housing 16 is preferably made of Inconel 625, stainless steel, or other metal having high corrosion and temperature resistance, required strength, and a high coefficient of thermal expansion as compared to that of the seal ring 11. The housing 16 includes a series of holes 20 bored into a surface 21 of the housing 16 and proximate the inner diameter of the housing. A spring 22 fits into each hole 20 and serves to provide a mechanical spring force for opposing the opening force supplied by a noncontacting seal between the sealing face 12 and the rotor seal ring face. An annular stopper 23 is attached to the seal ring housing 16 and extends radially inward to prevent unwanted axial movement of the seal ring 11 into the rotor seal ring.

Figure 2:
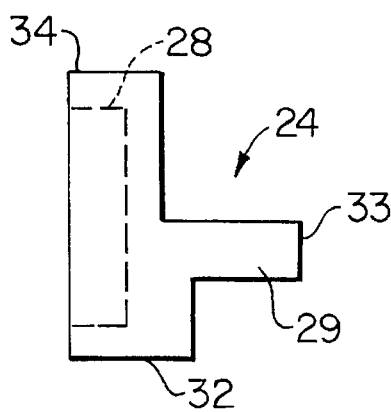
FIG. 2 is a cross-sectional view of the compliant "O" ring holder used in the seal shown in FIG. 1.

The stationary assembly according to the present invention further includes a compliant, annular "O" ring holder and an "O" ring. The stationary assembly 10, as shown in FIG. 1, includes a compliant "O" ring holder 24 and "O" ring 26. The "O" ring holder 24 incorporates a series of circular pockets 28, shown in FIG. 1 and by the dashed lines in FIG. 2. The pockets 28 retain springs 22 between the holes 20 of the seal ring housing 16 and the seal ring 11.

The "O" ring holder 24 further includes an annularly extending radial lip section 29 that gently forces and holds the "O" ring 26 against a balance diameter 31 at sealing point A, as shown in FIG. 1. The balance diameter 31 is a stationary component attached to the seal ring housing 16 and surrounding the shaft 13. The "O" ring 26 is squeezed between the balance diameter 31 and the lip section 29.

The springs 22 urge the "O" ring 26 against the seal ring 11 at sealing point B. The seals at points A and B provide a secondary seal between the seal ring and the balance diameter to prevent leakage of working gas or liquid from the machine body to the atmosphere.

The stationary assembly according to the present invention incorporates a pair of clearances. A first clearance, denoted by the letter "C" in FIG. 1, is provided between the outer diameter of the lip section 29 and the periphery of the annular notch 14 of the seal ring 11. This first clearance prevents differential thermal expansion from imparting a twisting moment on the seal ring 11 from the lip section 29. The first clearance also provides radial space for alignment of the springs 22 within the circular pockets 28 of the holder 24. Typically, the thickness of clearance C is in the range of 15 to 30 mills, a thickness large enough to prevent differential thermal expansion between the "O" ring holder 24 and the seal ring 11 from imparting a twisting moment on the seal ring 11.

A second clearance, denoted by the letter "D" in FIG. 1, is provided between a face 33 of the lip section 29 and the seal ring 11. This second clearance ensures contact between the "O" ring 26 and the seal ring 11 at point B. Thus, the lip section 29 of the holder 24 will not contact the seal ring 11.

If the axial length of the lip section were too long (i.e., longer than the cross sectional diameter of the "O" ring), "bottoming out" of the seal components would occur. In other words, face 33 would impact the seal ring 11 and the desired contact between the "O" ring 26 and the seal ring 11 to form the secondary seal would not occur. Therefore, the thickness of clearance D depends on the radial cross section of the "O" ring 26. Typically, the length of the lip section 29 is 5% less than the "O" ring cross sectional diameter.

The "O" ring holder, according to the present invention, is designed to be circumferentially flexible. The "O" ring holder flexes outwardly and inwardly in the radial direction to conform to thermal expansion, centrifugal effects, and tolerance stack up. The flexibility reduces the radial squeeze imparted on the "O" ring, thereby reducing undesirable "O" ring frictional forces.

Figure 3:
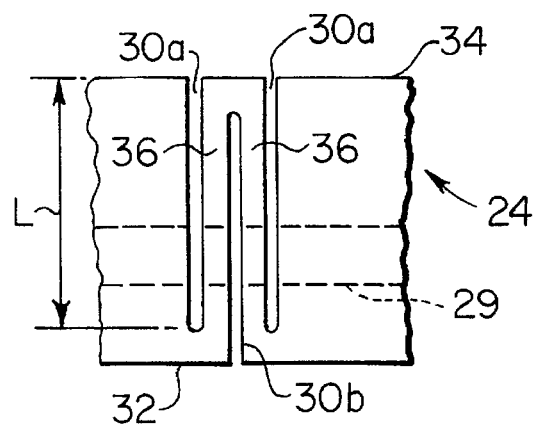
FIG. 3 is a fragmentary end view of a first embodiment of the compliant "O" ring holder for use in the seal shown in FIG. 1.
Figure 4:
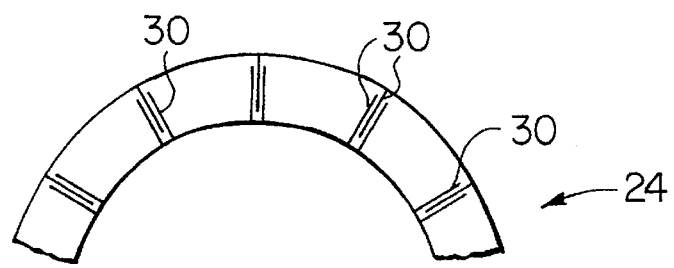
FIG. 4 is a fragmentary end view of a compliant "O" ring holder according to a second embodiment of the present invention for use in the seal shown in FIG. 1.

As embodied herein, the "O" ring holder 24, as shown in FIG. 3, includes a plurality of slots 30 to achieve the circumferential flexibility. In the preferred embodiment shown in FIG. 4, the holder 24 includes a plurality of sets of three slots 30, each set spaced 30° around the holder 24 from the adjacent sets. FIG. 4 does not show the pockets in the holder 24. However, these pockets are preferably centered between each set of slots 30.

Each slot 30 has a preferable thickness in the range of four to eight mills. The slots 30 are preferably formed by wire electric discharge machine (EDM) cutting, although any other suitable method known in the art may be employed, such as laser cutting. EDM cutting is most accurate and ensures that no burrs occur in the slot.

Each set of slots includes two outboard slots 30a initiated from either the outer diameter or the inner diameter of the holder 24. A third slot 30b is centered between the two slots 30a and is initiated opposite from slots 30a. As shown in FIG. 3, the center slot 30b extends radially outward from an inner peripheral surface 32 of the holder 24, whereas the outboard slots 30a extend radially inward from an outer peripheral surface 34 of holder 24. However, as shown in FIG. 4, slots 30 may be arranged with a reverse orientation, the outboard slots extending radially outward and the center slots extending radially inward.

The incorporation of the slots 30 into the holder 24 forms flexible beam sections 36. In the preferred embodiment, the holder 24 includes two beam sections 36. The slots 30 and beam sections 36 allow the holder 24 to be circumferentially flexible and capable of conforming to variations due to tolerance stack up and thermal, centrifugal, and pressure effects described in the above "Description of the Related Art."

Figure 5:
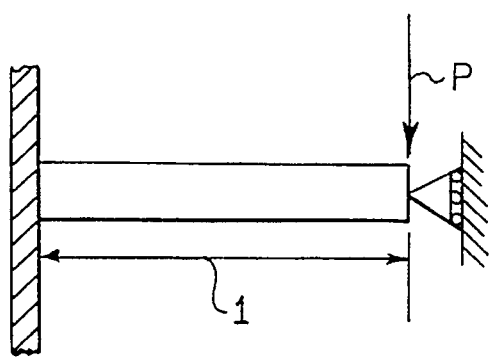
FIG. 5 is a schematic diagram of a cantilever beam used for analytic modeling of the "O" ring holder flexible beam sections.

Analytically, a flexible beam section 36 can be modeled as a cantilever beam under conditions of one fixed end and one unconstrained end. With reference to FIG. 5, an approximation of deflection can be determined according to the following formula.

$$Y_{max} = Pl^3/3EI \qquad \text{(Eq. 1)}$$

where

P=load applied;
l=effective length of beam;
E=modulus of elasticity of beam; and
I=moment of inertia of beam.

The resulting stress on the beam section 36 may be approximated according to Equation 2.

$$\sigma = Mc/I \qquad \text{(Eq. 2)}$$

where

M=force moment =Pl/2; and
c=distance from centroid axis to applied load.

Varying the length or thickness of the flexible beam sections 36 will vary the circumferential flexibility of the "O" ring holder 24. The holder 24 can be designed for a desired flexibility by, for example, utilizing a finite element analysis and an iterative computer code to analyze the deflection and stress distribution. In tests, the above theoretical equations predict actual measured values very closely. These tests also show that the force required to displace an "O" ring contained in a holder incorporating beamed sections 36 was significantly less than that required in present technology, thus indicating a much lower "O" ring frictional force to overcome. As explained in the "Description of the Related Art," lowering the frictional force reduces the possibility of seal failure.

The tests further indicated that the required force to displace the "O" ring was a consistently constant value over the deflection range. The deflection range is the range of "O" ring axial displacement. In typical applications, the deflection range is from approximately 30 to 100 mills. A constant displacement force over the deflection range indicates that the "O" ring frictional force remains constant during axial displacement and does not increase.

Figure 6:
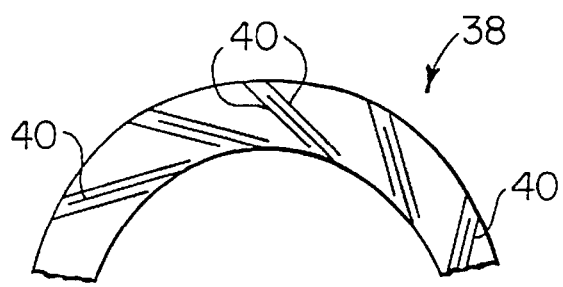
FIG. 6 is a fragmentary end view of a compliant "O" ring holder according to a third embodiment of the present invention for use in the seal shown in FIG. 1.
Figure 7:
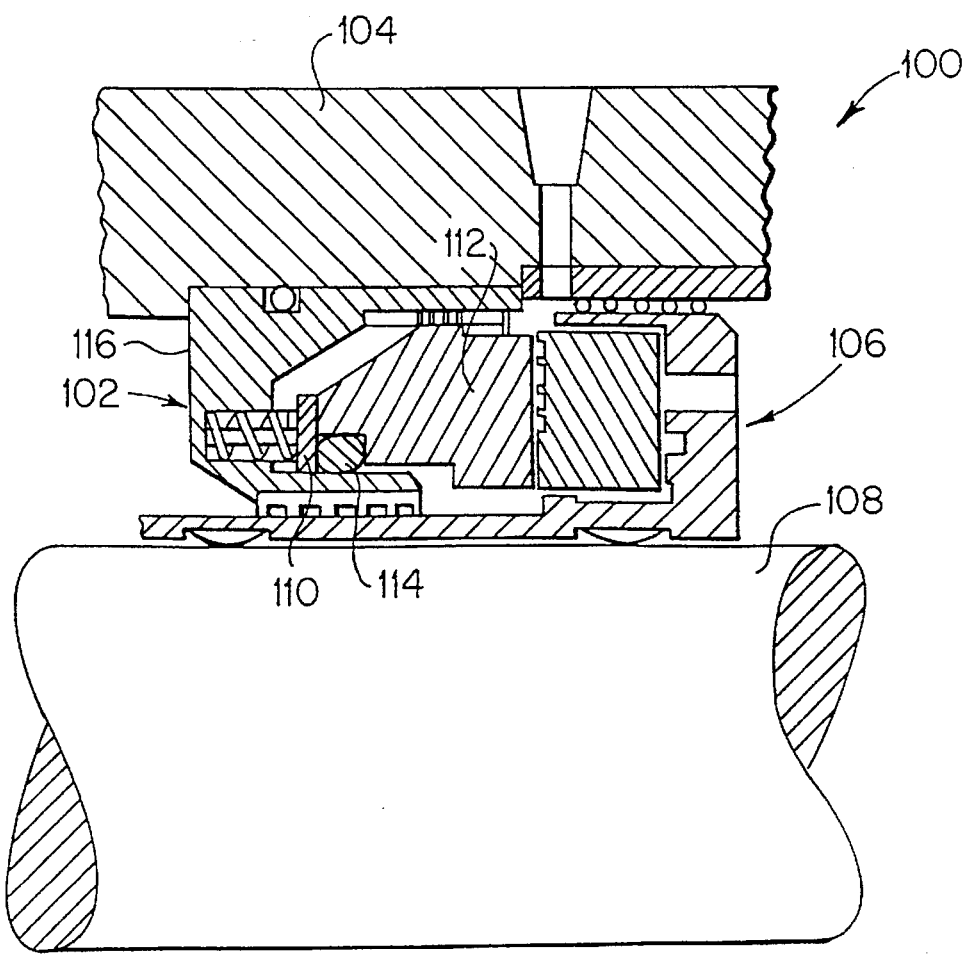
FIG. 7 is partial cross-sectional view of a conventional pusher type non-contacting gas seal.

It is to be understood that other configurations of the holder 24 are within the spirit and scope of the present invention. For example, variations in the number of slots, number of sets of slots, and depth and thickness of the slots will alter the flexibility of the holder 24. In addition, machining of the slots may be performed at an angle with respect to the peripheral surfaces of the holder. As shown in FIG. 6, an "O" ring holder 38 includes a plurality of sets of angled slots 40. The use of angled slots 40 increases the effective length of the beam sections and results in a holder of higher flexibility. In addition, the shape of the holder 24, as well as its material, may be designed for a particular application.

As explained, the incorporation of the slots and the flexible beam sections into the "O" ring holder increases the circumferential flexibility of the "O" ring holder. The increased flexibility reduces the need for undesirably precise tolerances on machined mating parts, minimizing the effects of dimensional variations.

In addition, the flexibility reduces the radial squeeze imparted on the "O" ring due to thermal expansion, centrifugal effects, and tolerance stack up. Thus, an optimum "O" ring radial squeeze can be more readily maintained. The reduced radial squeeze decreases the force required to overcome the "O" ring frictional force and displace the "O" ring and "O" ring holder as compared to existing technology. Easier displacement of the "O" ring and "O" ring holder improves the dynamic tracking capability of the gas seal and lowers the possibility of seal failure.

The compliant "O" ring holder, according to the present invention, is suitable for use in a variety of sealing technologies utilizing "O" ring squeeze-type secondary seals. In particular, the "O" ring holder has industrial and aerospace application in non-contacting gas face seals, contacting pusher type seals (both lubricated and dry running), and non-contacting pusher type seals.

Experimental tests have been undertaken to investigate "O" ring force-to-slide characteristics. The purpose of these tests was to determine what factors most strongly influence the force required to move the "O" ring, i.e., to overcome "O" ring frictional forces due to tolerance stack-up and thermal and centrifugal effects. The tests examined the following five factors likely to affect static and dynamic force-to-slide: "O" ring holder type (either solid conventional type or compliant with EDM cut slots according to the present invention), "O" ring material, balance diameter surface finish, "O" ring radial squeeze, and dwell-time after seal assembly.

Experimental test runs were conducted at various design values for each of the five factors. The test results were analyzed by computer programs to determine the extent that each of the design factors contributes to the development of static and dynamic friction. The analysis indicated that the overwhelming factor influencing static and dynamic force-to-slide is "O" ring holder type. Force-to-slide is significantly reduced by a change in holder type, from conventional to compliant with slots and beam sections.

The conclusion that the EDM-cut "O" ring holder induces a statistically significant reduction in force-to-slide confirms that circumferential flexibility is increased, reducing the force required to overcome "O" ring frictional forces and displace the "O" ring as compared to conventional technology.

It will be apparent to those skilled in the art that various modifications and variations can be made to the seal of the present invention without departing from the scope or spirit of the invention. Thus, it is intended that the present invention cover the modifications and variations of this invention provided they come within the scope of the appended claims and their equivalents.

What is claimed is:

1. A stationary assembly for use in a gas seal for sealing an interface between a machine body and a rotatable shaft, the stationary assembly comprising:

an annular seal ring attached to said machine body and surrounding said shaft;

an annular seal ring housing securing said seal ring, said housing including a plurality of bores, each said bore for retaining a spring;

an "O" ring holder for receiving said springs, said "O" ring holder being circumferentially flexible in the radial direction; and an "O" ring pressed against a balance diameter surrounding said shaft and said seal ring by said "O" ring holder to provide a seal.

2. The stationary assembly according to claim 1, further comprising:

an annular notch in a radial inner portion of said seal ring; and a axial lip section extending from said "O" ring holder into said annular notch, said lip section pressing said "O" ring against said balance diameter.

3. The stationary assembly according to claim 2, wherein said lip section and an upper peripheral surface of said notch define an annular clearance to prevent a twisting moment from being imparted on said seal ring by said lip section.

4. The stationary assembly according to claim 2, wherein said seal ring and an outer face of said lip section define an annular clearance to ensure contact between said seal ring and said "O" ring.

5. The stationary assembly according to claim 4, wherein the length of said lip section is approximately 5% less than the radial cross-sectional diameter of said "O" ring.

6. A stationary assembly for use in a gas seal for sealing an interface between a machine body and a rotatable shaft, the stationary assembly comprising:

an annular seal ring attached to said machine body and surrounding said shaft;

an annular seal ring housing securing said seal ring, said housing including a plurality of bores, each said bore for retaining a spring;

an "O" ring holder for receiving said springs, said "O" ring holder including a plurality of slots formed therein and arranged to provide circumferential flexibility; and an "O" ring pressed against a balance diameter surrounding said shaft and said seal ring by said "O" ring holder to provide a seal.

7. The stationary assembly according to claim 6, wherein said plurality of slots include first and second slots extending radially inward from an outer peripheral surface of said "O" ring holder and a third slot extending radially outward from an inner peripheral surface of said "O" ring holder, said third slot being positioned between said first and second slots to form first and second flexible beam sections.

8. The stationary assembly according to claim 6, wherein said plurality of slots include first and second slots extending radially outward from an inner peripheral surface of said "O" ring holder and a third slot extending radially inward from an outward peripheral surface of said "O" ring holder, said third slot being positioned between said first and second slots to form first and second flexible beam sections.

9. The stationary assembly according to claim 6, wherein said plurality of slots include first and second sets of slots extending radially inward from an outer peripheral surface of said "O" ring holder and a third set of slots extending radially outward from an inner peripheral surface of said "O" ring holder, each slot of said third set of slots being positioned between respective slots of said first and second set of slots to form respective first and second flexible beam sections.

10. The stationary assembly according to claim 6, wherein said plurality of slots include first and second sets of slots extending radially outward from an inner peripheral surface of said "O" ring holder and a third set of slots extending radially inward from an outer peripheral surface of said "O" ring holder, each slot of said third set of slots being positioned between respective slots of said first and second set of slots to form respective first and second flexible beam sections.

11. The stationary assembly according to claim 6, wherein said slots are substantially perpendicular to peripheral surfaces of said "O" ring holder.

12. The stationary assembly according to claim 6, wherein said slots are skewed with respect to peripheral surfaces of said "O" ring holder.

13. A stationary assembly for use in a gas seal for sealing an interface between a machine body and a rotatable shaft, the stationary assembly comprising:

an annular seal ring attached to said machine body and surrounding said an annular seal ring housing securing said seal ring;

an "O" ring for providing a seal between said seal ring and a balance diameter connected to said seal ring housing; and an "O" ring holder for retaining said "O" ring against said seal ring, said "O" ring holder being circumferentially flexible in the radial direction.

14. The stationary assembly according to claim 13, further comprising means for forcing said "O" ring against said seal ring.

15. The stationary assembly according to claim 14, wherein said forcing means include a plurality of springs between said seal ring housing and said seal ring.

16. The stationary assembly according to claim 15, wherein said seal ring housing includes a plurality of bores, each bore for retaining a spring.

17. The stationary assembly according to claim 16, wherein said "O" ring holder includes a plurality of pockets corresponding to said plurality of bores for retaining said springs between said seal ring housing and said seal ring.

18. A stationary assembly for use in a gas seal for sealing an interface between a machine body and a rotatable shaft, the stationary assembly comprising:

an annular seal ring attached to said machine body and surrounding said shaft;

an annular seal ring housing securing said seal ring;

an "O" ring for providing a seal between said seal ring and a balance diameter connected to said seal ring housing; and a circumferentially flexible "O" ring holder for retaining said "O" ring against said seal ring, said "O" ring holder including a plurality of slots formed therein and arranged to provide said circumferential flexibility.

19. The stationary assembly according to claim 18, wherein said plurality of slots include first and second slots extending radially inward from an outer peripheral surface of said "O" ring holder and a third slot extending radially outward from an inner peripheral surface of said "O" ring holder, said third slot being positioned between said first and second slots to form first and second flexible beam sections.

20. The stationary assembly according to claim 18, wherein said plurality of slots include first and second slots extending radially outward from an inner peripheral surface of said "O" ring holder and a third slot extending radially inward from an outward peripheral surface of said "O" ring holder, said third slot being positioned between said first and second slots to form first and second flexible beam sections.

21. The stationary assembly according to claim 18, wherein said plurality of slots include first and second sets of slots extending radially inward from an outer peripheral surface of said "O" ring holder and a third set of slots extending radially outward from an inner peripheral surface of said "O" ring holder, each slot of said third set of slots being positioned between respective slots of said first and second set of slots to form respective first and second flexible beam sections.

22. The stationary assembly according to claim 18, wherein said plurality of slots include first and second sets of slots extending radially outward from an inner peripheral surface of said "O" ring holder and a third set of slots extending radially inward from an outer peripheral surface of said "O" ring holder, each slot of said third set of slots being positioned between respective slots of said first and second set of slots to form respective first and second flexible beam sections.

23. The stationary assembly according to claim 18, wherein said slots are substantially perpendicular to peripheral surfaces of said "O" ring holder.

24. The stationary assembly according to claim 18, wherein said slots are skewed with respect to peripheral surfaces of said "O" ring holder.

* * * * *

UNITED STATES PATENT AND TRADEMARK OFFICE
CERTIFICATE OF CORRECTION

PATENT NO.   : 5,639,097
DATED        : June 17, 1997
INVENTOR(S)  : James F. GARDNER et al.

It is certified that error appears in the above-indentified patent and that said Letters Patent is hereby corrected as shown below:

Claim 13, col. 7, line 62, "surrounding said" should read
--surrounding said shaft;--

Claim 2, col. 6, line 61, "a axial" should read --an axial--

Title page, col. 2, under "Attorney, Agent, or Firm", insert
--, L.L.P.-- after "and Dunner"

Signed and Sealed this

Sixteenth Day of November, 1999

Attest:

Q. TODD DICKINSON

*Attesting Officer*   *Acting Commissioner of Patents and Trademarks*